United States Patent [19]

Thorndyke et al.

[11] Patent Number: 4,689,776
[45] Date of Patent: Aug. 25, 1987

[54] PORTABLE ANIMAL CONTROL UNIT

[76] Inventors: Terence Thorndyke, 10659 Northgate Dr., Palo Cedro, Calif. 96073; Allan L. Swain, Star Rte. Box 108B, Whitmore, Calif. 96096

[21] Appl. No.: 859,095

[22] Filed: May 2, 1986

[51] Int. Cl.[4] ............................................. H04B 1/02
[52] U.S. Cl. .................................... 367/139; 367/137
[58] Field of Search ......................................... 367/139

[56] References Cited

U.S. PATENT DOCUMENTS

| | | | |
|---|---|---|---|
| 3,683,113 | 8/1972 | Stewart | 367/139 |
| 3,838,418 | 9/1974 | Brown | 367/139 |
| 4,484,316 | 11/1984 | Nakagawa | 367/139 |
| 4,566,085 | 1/1986 | Weinberg | 367/139 |

Primary Examiner—Stephen C. Buczinski
Assistant Examiner—Melissa L. Koltak
Attorney, Agent, or Firm—Townsend & Townsend

[57] ABSTRACT

A portable animal control unit includes circuitry incorporated in a miniature housing for generating an animal influencing modulated soundwave in the ultrasonic frequency range. A first oscillator produces an output signal for driving an ultrasonic transducer, the output signal having a center frequency in the ultrasonic range. A second oscillator produces an output control signal for modulating the frequency of the first oscillator, the modulation rate being determined by the center frequency of the second oscillator output signal and the amount of deviation of the second oscillator from the center frequency.

9 Claims, 5 Drawing Figures

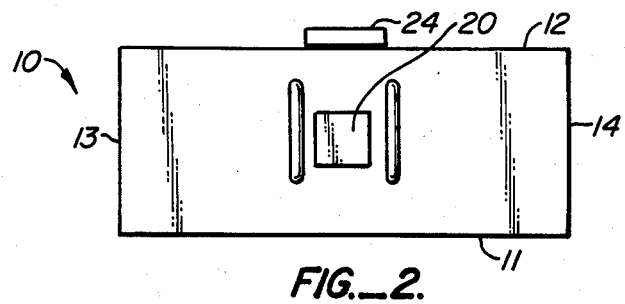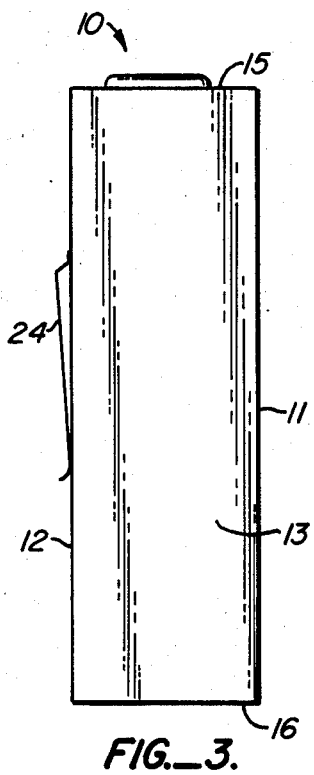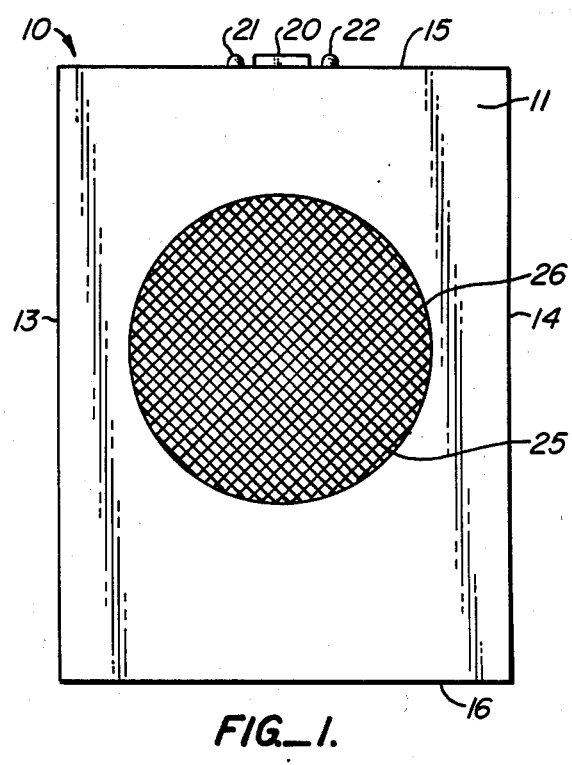

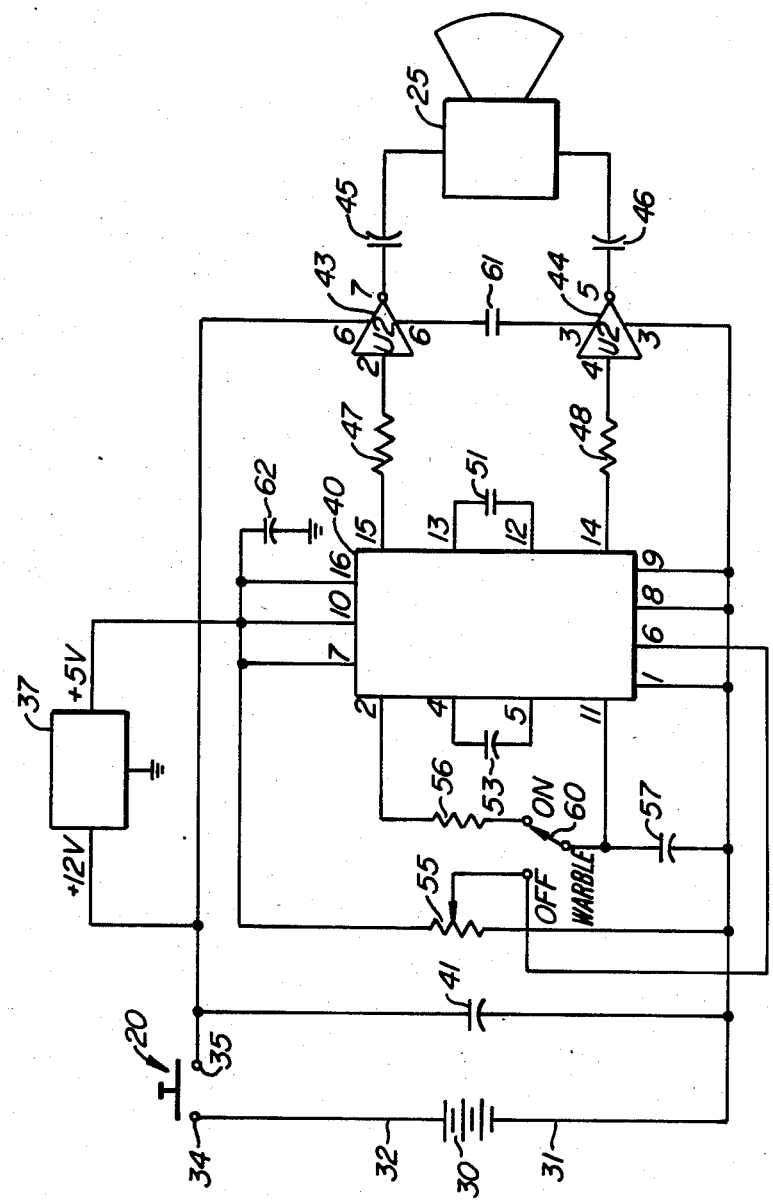
FIG._4.

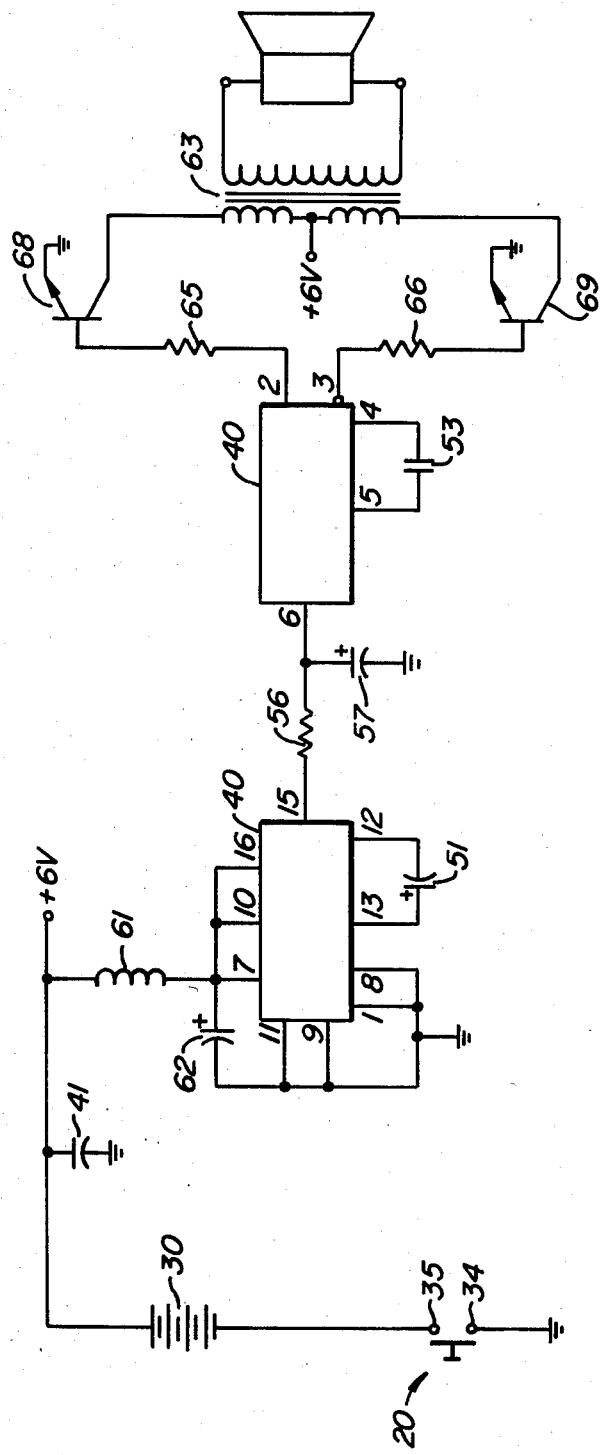
FIG._5.

PORTABLE ANIMAL CONTROL UNIT

BACKGROUND OF THE INVENTION

This invention relates to electrically powered portable devices for influencing the behavior of animals.

Numerous occasions arise when it is desirable to have some means for influencing the behavior of animals. Perhaps the most common occasion which arises involves a menacing dog encountered in the course of any one of a number of activities, such as jogging, walking, cycling, delivering mail, reading utility meters, and a variety of other business and personal activities. Such an encounter is, at best, unsettling and, at worst, physically dangerous. The physical danger of being bitten by a unruly dog is compounded by the possibility that the dog may be rabid. Once bitten, unless the dog can be located and tested negatively for rabies, the victim must undergo painful rabies shots as a preventive measure, which compounds the physical pain inflicted by the dog.

Since such encounters usually occur out of doors, any device designed to influence the dog's behavior (e.g., by driving the dog away) must, of necessity, be portable in order to have utility. Many portable devices have been proposed for this purpose, nearly all of which incorporate a battery power source and a high voltage generator for the purpose of shocking the dog. While useful, such devices have two major limitations. Firstly, the amount of electrical power which can be stored in a portable device is relatively small, with the result that the device will only operate over a few cycles. Once the power source has been discharged, the device is useless. Another major disadvantage in electrical shock devices resides in the fact that the effective use of such a device requires close proximity to the dog, which is frequently an elusive target. Thus, in attempting to prod the dog, the user may miss and still be bitten.

SUMMARY OF THE INVENTION

The invention comprises a portable animal control unit which is devoid of the above disadvantages and which is highly effective in controlling the menacing behavior of dogs and other animals.

In a most general aspect, the invention includes a portable housing incorporating means for generating an animal influencing modulated soundwave in a predetermined frequency range, the housing being optionally provided with a clip for enabling the unit to be removably attached to the user, e.g., by clipping on a belt, a shirt pocket, or some other portion of a user's garment.

The generating means is controlled by an externally accessible switch mounted on the housing for enabling selective actuation of the generating means by the user.

The generating means includes a transducer driven by a dual oscillator circuit means. The dual oscillator circuit means includes a first oscillator for generating a first relatively high frequency signal in a predetermined frequency range, and a second oscillator coupled to the first oscillator for generating a relatively low frequency signal for modulating the first signal over a range of frequencies irritating to an animal. The range of frequencies for the first signal is from about 5 to about 40 khz, while the relatively low frequency signal is in the range from about 3 to about 10 hz.

The unit includes a source of DC power, and the externally accessible switch means is coupled between the DC power source and the generating means so that DC power is only applied to the generating means when the externally accessible switch means is actuated by a user.

The generating means includes a coupling switch for controlling the coupling between the output of the second oscillator and the input of the first oscillator in a first switch setting and for controlling the coupling between a variable resistance and the first oscillator when in a second, alternative setting fo enabling manual setting of the frequency of the high frequency signal when the second oscillator is decoupled from the first oscillator by the coupling switch. The frequency of the low frequency signal output of the second oscillator determines the sweep frequency and deviation of the first signal output from the first oscillator.

In use, the coupling switch is set to the position whereby the output of the second oscillator is coupled to the input of the first oscillator. In the field, the device is actuated by user manipulation of the externally accessible switch, which applies power to the dual oscillator circuit and causes the emission of a modulated soundwave which is swept over the range noted above at the relatively low rate of from 3 to about 10 hz.

The invention avoids the necessity found with prior art electrical shock devices of waiting until the animal is in close physical proximity before taking control action against the animal. In particular, the device may be actuated when the animal is positioned a safe distance from the user. In addition, since the unit consumes relatively little electrical power (when compared to an electrical shock device), there is no danger that the device will stop operating before the animal has been repelled.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a front elevational view of a preferred embodiment of the invention;

FIG. 2 is a top plan view of the device of FIG. 1;

FIG. 3 is a left end elevational view of the device of FIG. 1;

FIG. 4 is a circuit schematic of a first embodiment of the invention; and

FIG. 5 is a circuit schematic of a second embodiment of the invention.

Turning now to the drawings, FIGS. 1–3 illustrate a preferred embodiment of the invention. As seen in these Figs., the invention includes a housing generally designated by reference numeral 10 having front and back walls 11, 12, respectively, sidewalls 13, 14, and top and bottom walls 15, 16. Mounted to the top wall 15 is an externally accessible operating switch 20 which controls the circuitry shown in FIG. 4 in the manner described below. A pair of guard ridges 21, 22 flank switch 20 to reduce the possibility of accidental actuation of the device.

Mounted on back wall 12 is a clip 24 which is used to afford removable attachment of the device to a belt, a shirt pocket, or some other suitable portion of a user's garment.

A transducer 25 is mounted in housing 10 in any suitable fashion, the transducer 25 being concentrically arranged with respect to a sound hole 26 formed in front wall 11.

With reference to FIG. 4, the circuitry used to drive transducer 25 includes a battery 30 for providing suitable DC voltage to the circuitry shown in the Figure. One terminal 31 of battery 30 constitutes a common ground terminal for the circuit elements as shown. The other terminal 32 of battery 30 is coupled to a first terminal 34 of switch 20. The other terminal 35 of switch 20 is coupled to a voltage regulating integrated circuit 37, which functions to convert the voltage supplied by battery 30 to a suitable regulated voltage source for a dual oscillator integrated circuit 40. In the preferred embodiment, circuit 37 provides five volts DC regulated from a 12 volt battery source.

A capacitor 41 is coupled across ground battery terminal 31 and the positive terminal 35 of switch 20 to filter switching voltage transients generated when switch 20 is actuated and deactuated.

A pair of dual transducer driver circuits 43, 44 are powered by the full battery voltage as shown. The output of each driver circuit 43, 44 is coupled through a capacitor 45, 46 to the terminals of transducer 25. The input of each driver circuit 43, 44 is coupled to the output of an oscillator incorporated into a dual VCO integrated circuit 40 by means of resistors 47, 48.

The heart of the ultrasonic generating circuit shown in FIG. 4 is the dual VCO integrated circuit 40, which incorporates a pair of voltage controlled oscillators: a first oscillator configured to generate a transducer driving signal in the predetermined relatively high frequency range, and a second oscillator configured to generate a relatively low frequency signal for modulating the relatively high frequency signal of the first oscillator. Integrated circuit 40 preferably comprises a type 74 LS 625 circuit powered by the regulated five volts DC output of regulator 37. A capacitor 51 coupled to terminals 12 and 13 of circuit 40 determines the center frequency of the first oscillator, which in the preferred embodiment is about 20 khz. The output of this oscillator is provided on terminals 14, 15 as complementary square wave outputs which, as noted above, are coupled as the output signals to drivers 43, 44.

The low frequency oscillator center frequency is principally determined by a capacitor 53 coupled to terminals 4, 5 of circuit 40. The input to the second oscillator is terminal 6 of circuit 40, which is coupled to the adjustable element of a variable resistance 55 having an upper terminal coupled to the regulated voltage output of regulator circuit 37. The value of resistance 55 determines the deviation of the second, low frequency oscillator from the center frequency, and thus the degree of sweep or "warble" (sweep frequency). The output of the second, low frequency oscillator appears on terminal 2 of circuit 40, while the input to the first, high frequency oscillator is terminal 11 of circuit 40.

Resistor 56 and capacitor 57 convert the output of the second oscillator from a square wave output to a saw tooth wave input to the first oscillator when a function switch 60 is in the position illustrated (WARBLE ON).

To initially set up the circuit, switch 20 is closed to apply power to the circuit elements, and variable resistance 55 is adjusted while monitoring the output of the low frequency oscillator on terminal 2 or the output of the high frequency oscillator on terminals 14, 15 using appropriate equipment, to set the sweep period. The device is now ready for field use.

In the field, the user merely activates switch 20 to apply power to the circuitry. Upon the application of power, both oscillators commence operation, resulting in the generation of a signal swept over a range of frequencies at a rate determined by the frequency of the second oscillator and between end points determined by the amount of deviation from the center frequency of the second oscillator. It has been empirically determined that a center frequency in the range from 5 to 6 hz for the low frequency oscillator and a swept range of from about 8 khz to about 40 khz for the high frequency oscillator produces optimum results for menacing dogs.

Switch 60 may be used to experiment in the field by manipulating the blade to the unillustrated position. In this position, the output of the low frequency oscillator, and the variable resistance 55 is connected to the input of the high frequency oscillator. By closing switch 20 and manually adjusting variable resistance 55, the value of the control voltage applied to the input of the high frequency oscillator can be varied, with the result that the output of the high frequency oscillator is manually swept. By noting the manual sweep rate and high frequency sweep range, optimum values can be empirically selected, after which the values of resistor 56 and capacitors 51, 53 and 57 can be selected to provide the desired sweep rate and high frequency range.

The following components were used in the fabrication of the circuit of FIG. 4.

| REF. NO. | DESCRIPTION |
| --- | --- |
| 20 | Alco push button switch form A |
| 25 | Allied speaker, 4 k-50 khz, 60 w |
| 30 | Eveready #CH15 battery 12 VDC (8 cells AA) |
| 37 | Type 78 L05C VREG integrated circuit |
| 40 | Type 74 LS 625 dual VCO integrated circuit |
| 41 | Sprague 150 D capacitor, 10 Mfd, 15 V |
| 43, 44 | Type DS0026 dual driver integrated circuit |
| 45, 46 | Sprague 150 D capacitor, 10 Mfd, 15 V |
| 47, 48 | AB RC07 resistor, 100 ohm, ¼ W, 5% |
| 51 | Sprague 192 P capacitor, .015 Mfd, 50 V |
| 53 | Sprague 150 D capacitor, 10 Mfd, 15 V |
| 55 | AB variable resistor, 10K |
| 56 | AB RC07 3.9K resistor, ¼ W, 5% |
| 57 | Sprague 150 D capacitor, 10 Mfd, 15 V |
| 60 | Alco toggle switch, form C |
| 61 | Sprague CK06.1 Mfd capacitor, 50 V |
| 62 | Sprague 150 D 1 Mfd capacitor, 15 V |

FIG. 5 shows a second embodiment of the invention which provides a relatively higher sound level (in excess of 100 db), eliminates the need for the voltage regulator 37 of the FIG. 4 embodiment, and reduces the level of the DC voltage required to power the circuit. The embodiment in FIG. 5 uses many of the elements already described in connection with the FIG. 4 embodiment, and these common elements bear the same reference numerals. Also, the dual voltage controlled oscillator integrator circuit 40 is illustrated as two separate components to emphasize the serial nature of the connection between the two oscillator circuits incorporated into the single integrated circuit.

In the FIG. 5 embodiment, the positive terminal of battery 30 is coupled to one terminal of an inductor 61, which functions in combination with capacitor 62 as a low pass filter to smooth out any ripple on the DC voltage supplied by the battery to the integrated circuit 40 and also to the center tap of the primary side of an output transformer 63. The output side of transformer 63 is coupled to a piezoelectric transducer, which may comprise a Motorola two inch diameter model KSN1020A transducer having an upper range of approximately 50 khz. The complimentary relatively high frequency output signals which are present on pins 2 and 3 of the right hand circuit 40 in FIG. 5 are coupled via individual resistors 65, 66 to the base of associated transistors 68, 69, which are connected in a grounded emitter configuration. The collector of each of the transistors 68, 69 is coupled to opposite ends of the primary winding of transformer 63. The center tap of the primary winding of transformer 63 is coupled directly to the positive six volt terminal of the battery 30.

In the FIG. 5 circuit, battery 30 preferably comprises a low profile six volt DC battery sold under the trademark Polapulse by Polaroid Corporation; the voltage regulating circuit 37 is eliminated; and the dual transducer drive circuit comprising elements 43–48 are eliminated. In addition, the following components were used in the fabrication of the circuit of FIG. 5.

| REF. NO. | DESCRIPTION |
|---|---|
| 41 | Sprague 150 D capacitor, 10 Mfd, 15 V |
| 51 | Sprague 150 D capacitor, 4.7 Mfd, 15 V |
| 53 | Sprague 192 P capacitor, .022 Mfd, 50 V |
| 61 | 100 Micro Henry inductor |
| 63 | Transformer with center tapped primary winding, 15 turns each half, 60 turns secondary |
| 68, 69 | NPN transistor, #ECG263 |

Elements 20, 41, 56 and 57 are the same as those employed in the FIG. 4 embodiment. In addition, warble switch 60 has been eliminated from the FIG. 5 embodiment, as well as variable resistance 55.

As will now be apparent, an animal control unit fabricated according to the teachings of the invention possesses several advantages not found in portable devices employing electric shocks to repel, or otherwise control, menacing animals. Firstly, close proximity to the animal is not required in order to use the device. In tests conducted with the invention, useful results have been obtained with large dogs at ranges up to 40 feet, and with small dogs at ranges up to 15 feet. In addition, the power drain of units fabricated according to the teachings of the invention is relatively low when compared to electrical shock devices. For example, in a unit fabricated using the components of FIG. 4, 150 one second cycles have been achieved before battery replacement become necessary. In addition, the unit is extremely light in weight and relatively small in size, the dimensions of the device shown in FIGS. 1-3 being four inches high, three inches wide, and one and one quarter inches deep.

While the above provides a full and complete disclosure of the preferred embodiment of the invention, various modifications, alternate equivalents and constructions may be employed without departing from the true spirit and scope of the invention. For example, while the invention has been described with reference to certain circuit components, other circuit components may be employed, as desired. In addition, while specific frequencies and frequency ranges have been given, it is understood that other center frequencies and other frequency ranges and warbling rates may provide beneficial results with animals other than dogs. Therefore, the above description and illustrations should not be construed as limiting the scope of the invention which is defined by the appended claims.

What is claimed is:

1. A hand held portable dog repelling device comprising:
    a housing having external dimensions sufficiently small to be conveniently carried by a user;
    means within said housing for generating a dog irritating continuous soundwave modulated over a predetermined frequency range at a predetermined relatively low rate, said generating means including oscillator means for generating a relatively high frequency signal in said predetermined frequency range and means coupled to said oscillator means for modulating said relatively high frequency signal over said predetermined frequency range at said predetermined relatively low rate, the ratio of said relatively high frequency to said relatively low rate lying in the range from about 2000:1 to 8000:1;
    power source means for activating said generating means; and
    externally accessible switch means carried by said housing for enabling user selective actuation of said generating means so that power is consumed only upon user demand.

2. The invention of claim 1 wherein said housing includes clip means for enabling said housing to be removably attached to a user.

3. The invention of said 1 wherein said generating means includes a transducer.

4. The invention of claim 3 wherein said oscillator means and said modulating means include a single dual voltage controlled oscillator integrator circuit.

5. The invention of claim 1 wherein said predetermined frequency is from about 5 to about 40 khz.

6. The invention of claim 1 wherein said relatively low rate is in the range from about 3 to about 10 hz.

7. The invention of claim 1 wherein said generating means includes a transducer and a dual transducer driver means between said oscillator means and said transducer.

8. The invention of claim 1 wherein said generating means includes a piezoelectric transducer, a transformer having an output coupled to said transducer and an input, and a dual transistor drive circuit having an input coupled to the output of said first oscillator means and a output coupled to the input of said transformer.

9. A portable animal control unit comprising:
    a portable housing;
    means within said housing for generating an animal influencing modulated soundwave in a predetermined frequency range; and
    externally accessible switch means carried by said housing for enabling selective actuation of said generating means, said generating means including first oscillator means for generating a relatively high frequency signal in the predetermined frequency range, and second oscillator means coupled to said first oscillator means for generating a relatively low frequency signal for modulating said first signal over a range of frequencies irritating to an animal, variable resistance means coupled to a source of voltage, and coupling switch means for coupling said second oscillator means to said first oscillator means when in a first position and for coupling said variable resistance means to the input of said first oscillator means when in a second position for enabling manual adjustment of the frequency of said relatively high frequency signal when said second oscillator means is decoupled from said first oscillator means by said coupling switch means.

* * * * *